United States Patent [19]
Gerulf

[11] Patent Number: 5,211,437
[45] Date of Patent: May 18, 1993

[54] COMBINATION TAILGATE AND RAMP ASSEMBLY

[76] Inventor: Dennis R. Gerulf, 333 North 5th St., Payette, Id. 83661

[21] Appl. No.: 910,195

[22] Filed: Jul. 8, 1992

[51] Int. Cl.⁵ .............................................. B62D 25/00
[52] U.S. Cl. ...................................... 296/61; 414/537
[58] Field of Search ............................ 296/61; 414/537

[56] References Cited

U.S. PATENT DOCUMENTS

| | | | |
|---|---|---|---|
| 3,510,015 | 5/1970 | Roshaven | 296/61 X |
| 3,756,440 | 9/1973 | Raap et al. | 414/537 |
| 3,972,428 | 8/1976 | Love, Jr. et al. | 414/537 |
| 4,003,483 | 1/1977 | Fulton | 414/537 |
| 4,657,233 | 4/1987 | Vroom | 296/61 X |
| 4,668,002 | 5/1987 | Hanson | 296/61 |
| 4,906,041 | 3/1990 | McKenzie | 296/61 |
| 5,096,362 | 3/1992 | Best | 414/537 |

Primary Examiner—Robert R. Song
Attorney, Agent, or Firm—Frank J. Dykas; Craig M. Korfanta; Ken J. Pedersen

[57] ABSTRACT

A combination tailgate and ramp assembly 10 formed of a pair of ramps 14 and 20, which when fastened together with fastener brackets 32 and 72 form a conventional tailgate hinged and rotatable about a transverse sliderail 30. Swing pin hinge 68 supports the lower left corner of ramp 14 and swing pin hinge 70 supports the lower right hand corner of right ramp 22 and provides three dimensional rotational ability. When unfastened, ramps 14 and 22 can be rotated down, out and over to form a loading ramp.

9 Claims, 11 Drawing Sheets

COMBINATION TAILGATE AND RAMP ASSEMBLY

BACKGROUND OF THE INVENTION

1. Technical Field

This invention relates to a combination tailgate and ramp assembly, and more particularly to a combination tailgate formed of a pair of ramps which assembled together form a tailgate and when broken down into separate ramps can be rotated down, out and over into a ramp configuration.

2. Background Art

One of the most common and aggravating problems for the owners of pickup trucks and the like is how to get wheeled vehicles, such as lawn and garden equipment, motorcycles or tracked vehicles such as snowmobiles, into the back of a pickup truck for transport. Often times these items are too heavy for a person working alone to load into a pickup truck bed without the use of a ramp. As a result, many people have resorted to the use of makeshift ramps made of wood, which are dangerous and bulky, or they will carry prefabricated, detachable ramps which are heavy and awkward to manipulate. A number of attempts have been made to produce safer and more convenient ramps, such as the one disclosed in Raap et al., U.S. Pat. No. 3,756,440, which teaches a foldable ramp which is supported, for storage and transport, on the inside surface of the tailgate. While the ramp panels as disclosed in Raap et al. can be swung about a hinge from a transverse storage position to a longitudinal ramp position, the configuration is heavy and awkward to use, in that it is added weight to the tailgate assembly.

In an effort to reduce the weight, Hansen, U.S. Pat. No. 4,668,002, provides an assembly which is a combination tailgate and ramp which include two separate foldable ramps made of a steel mesh which can be folded and stored in a movable tailgate frame to form the tailgate and ramp combination. However, in order to use the combination ramp and tailgate disclosed in Hansen, one must physically lift and remove each of the ramp assemblies, assemble them into a ramp, and then connect them to the bed of the truck. Since each ramp assembly is of considerable weight, this is difficult, and for some people it is a physical impossibility.

The third general solution to the problem is the removal of the tailgate in its entirety, and the substitution of a self-storing loading ramp, which is itself stored in an upright vertical position in lieu of the tailgate. This solution is feasible in the case of specialized "low boy" trailers, such as disclosed in Love, Jr. et al., U.S. Pat. No. 3,972,428 and McKenzie, U.S. Pat. No. 4,906,041. A fourth solution is disclosed in Best, U.S. Pat. No. 5,096,362, where the ramp can be stored behind the tailgate or truck door.

What is needed is a combination tailgate and ramp assembly which serve dual functions, both as a tailgate, and as a ramp, and more importantly an assembly wherein the conversion from a tailgate to a ramp can be accomplished by a single operator with most of the weight of the ramp being mechanically supported so as to eliminate the need to lift, assemble and reinstall ramp portions to the back of the truck. This object is facilitated by achieving a mechanical advantage for supporting the weight of the ramp sections.

DISCLOSURE OF INVENTION

The combination tailgate and ramp assembly is formed of two ramps, which when fastened together form a conventional shaped tailgate. The two ramps, identified as the left and right ramps, have each attached a single swing pin hinge, with the left ramp having an attached swing pin hinge at its left, lowermost corner, and the right ramp having its swing pin hinge attached at the right lowermost corner.

In conventional tailgate configuration, the left and right ramps are fastened together with left and right fastening brackets which are hinged to a transversely located slide rail adjacent to the end of the truck bed. The fastening brackets, holding the left and right ramps together, also function as hinges allowing for raising and lowering of the assembly in tailgate configuration between a vertical, closed position, and a horizontal, open position.

Left and right latches are provided which are formed of spring biased, vertically oriented, downwardly biased, latch pins, slidably held within latch pin brackets attached to the sidewalls of the truck bed which are designed to extend down into engagement with latch hold brackets attached to the sides of the ramps.

A changeover from the tailgate configuration to a ramp configuration is accomplished by removal of the fastening bolts holding left and right fastening brackets together with the two ramps. When unfastened, then each ramp is supported solely by its single swing pin hinge, and both ramps are capable of being swung out from the transverse orientation of tailgate configuration to one where the longitudinal axis of each ramp is parallel to the longitudinal axis of the truck bed. Right ramp, which is hinged at its right outermost corner, is provided with a swing pin hinge which is slidable upon the slide rail and permits transverse repositioning to allow right ramp to be lowered into the ramp configuration position. Left ramp, which is similarly hinged with left swing pin hinge attached to its left lowermost corner is similarly reoriented from the transverse orientation to a longitudinal orientation and rotated down into position to form a pair of parallel ramps for loading and unloading of equipment from the truck.

Tailgate straps are provided for use with the assembly in tailgate configuration. Spacing cams, slidably and rotatably mounted to the slide rail are provided for static support of the unhinged ends of the ramps against the slide rail when in the ramp configuration.

BEST MODE FOR CARRYING OUT INVENTION

Referring to FIGS. 1, 2, 9 and 10, the combination tailgate and ramp assembly 10, is shown in a conventional tailgate configuration. Basically the assembly, when locked together to form a conventional tailgate, functions as a conventional tailgate having two side latches which hold combination tailgate and ramp assembly 10 in an upright, closed position with respect to pickup truck 12.

Figure 1:
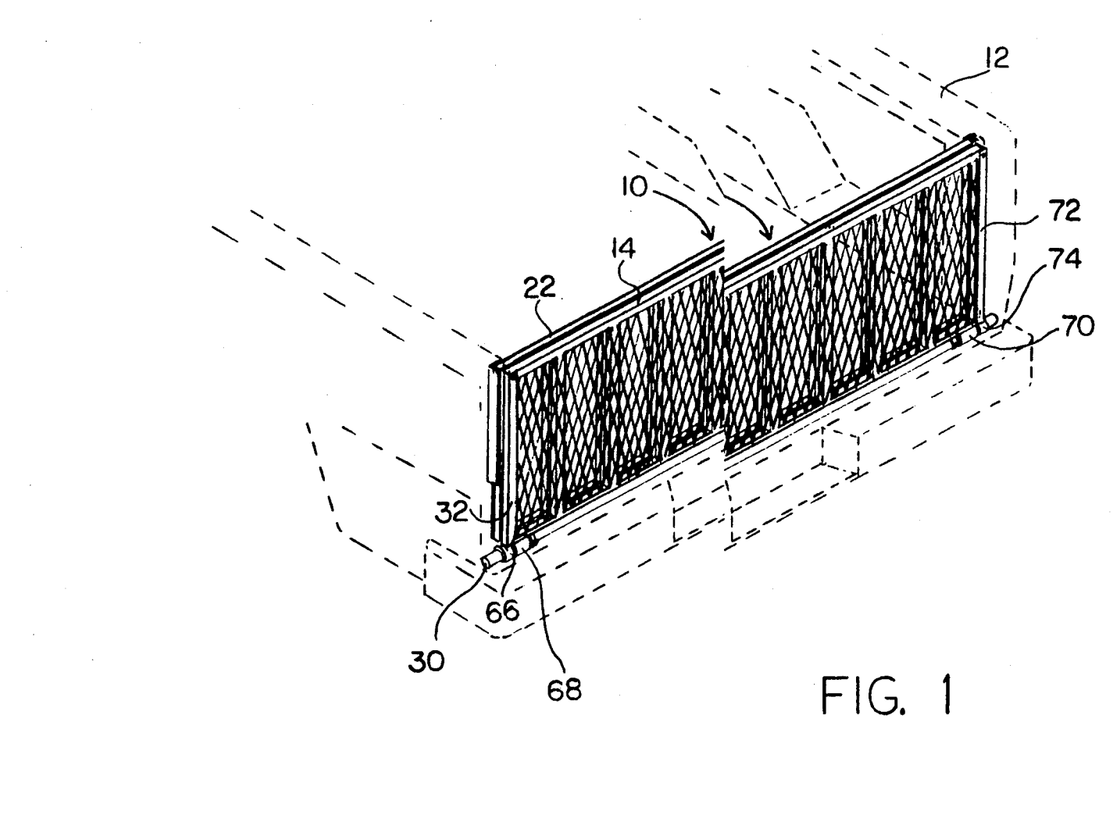
FIG. 1 is a perspective representational view of the combination tailgate and ramp assembly configured as a tailgate and held in the closed position.

Combination tailgate and ramp assembly 10 is formed of two ramps, left ramp 14 and right ramp 22, which together in combination with left fastening bracket 32 and right fastening bracket 72 form a conventional type tailgate, as is shown in FIG. 1. In FIG. 1 the ramps are shown with a mesh grating which, for the simplicity, are omitted from the rest of the drawings. The tailgate assembly and latch assembly for the left side are shown in detail in FIGS. 9 and 10, with left ramp 14 being attached on the outside of combination tailgate ramp assembly 10, and right ramp 22 on the inside with respect to the cab of the pickup truck. Right ramp 14 has formed integral with it right swing pin hinge 70, which, in the conventional tailgate configuration, rotatably resides about slide rail 30 in close proximity to right fastening bracket hinge 74, which is formed integral with right fastening bracket 72. In a like manner, left ramp 14 is attached to slide rail 30 by means of left swing pin hinge 68, which is rotatably attached to slide rail 30 and resides in close proximity to left fastening bracket hinge 66, which itself is formed integral with left fastening bracket 32.

Figure 4:
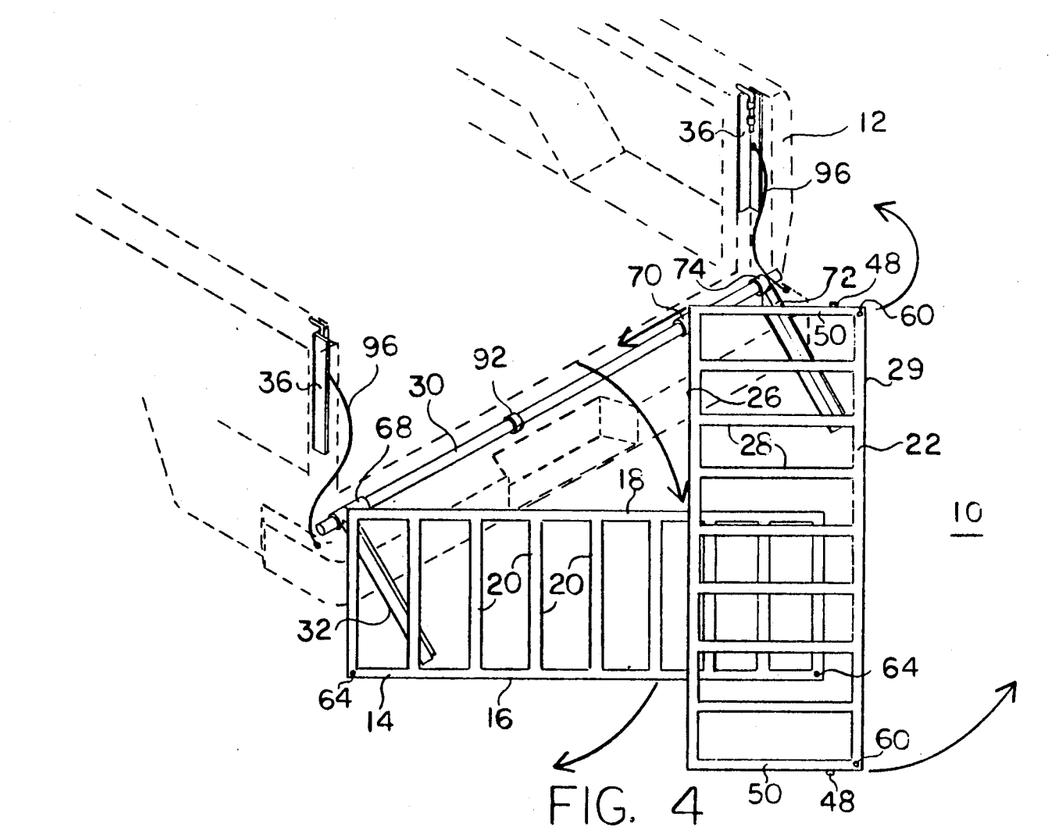
FIG. 4 is a perspective representational view of the combination tailgate and ramp assembly being repositioned from the tailgate assembly to the ramp configuration.

As can be seen in the drawings, and in particular in FIG. 4, the only mechanical connection between right ramp 22 and slide rail 30 is right swing pin hinge 70 and the only mechanical connection for left ramp 14 to slide rail 30, is left swing pin hinge 68. Thus, unless some additional mechanical means of connecting right ramp 22 and left ramp 14 together is provided, each would have a free, unattached end, when in the tailgate configuration. This additional mechanical connection is provided by right fastening bracket 72 and left fastening bracket 32, both of which serve dual functions, not only to interconnect the free ends of both ramps, but also to hold both ramps in proper alignment relative to slide rail 30.

Figure 9:
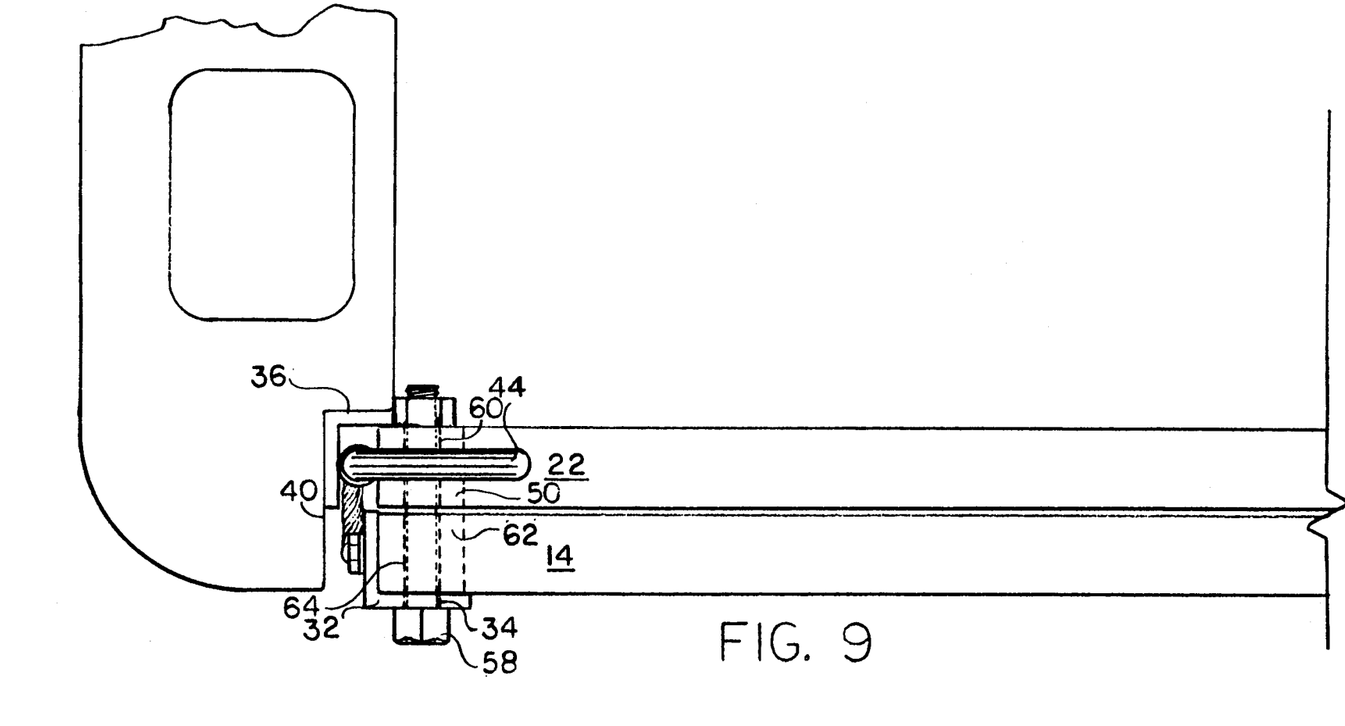
FIG. 9 is a sectional top view of the side latch assembly.
Figure 10:
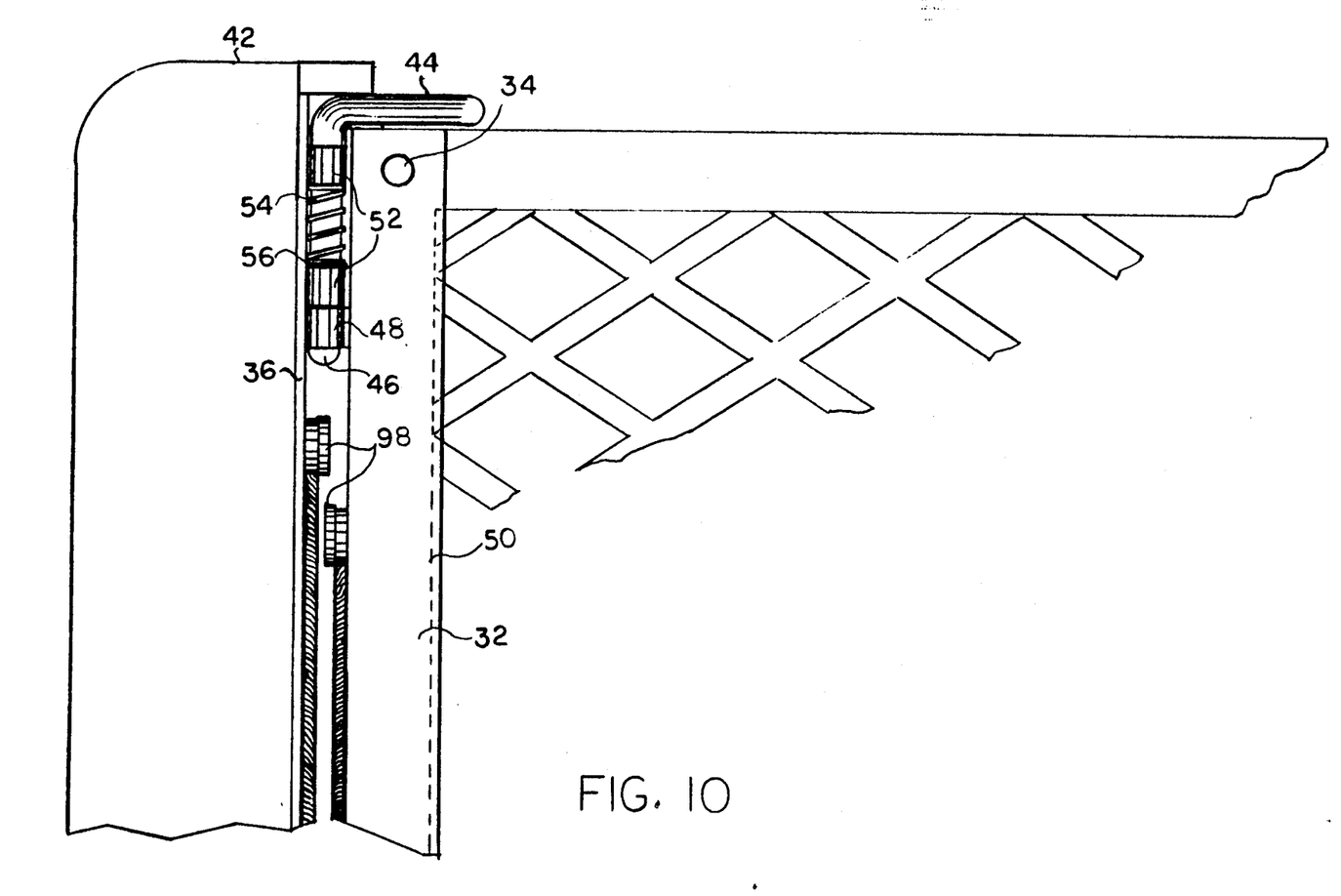
FIG. 10 is a sectional side view of the side latch assembly.

FIGS. 9 and 10 only show the left latch assembly. The right latch assembly is identical and for that reason is not shown in detail. Referring to FIGS. 9 and 10, it can be seen that formed integral with left ramp 14 is latch bolt hole 64, which is formed for alignment with latch bolt hole 60 in cross member 50 of right ramp 22 and hole 34 in left fastening bracket 32. Bolt 58 is provided to lock all three pieces together. Also attached to right ramp 22 is latch hole bracket 48 which is adapted to receive the end of latch pin 46 to hold the tailgate in an upright position.

The latch assembly itself is attached by means of latching bracket 36 to the interior surface of the pickup truck sidewall 40 by conventional means, either welding or bolting, extending normally out from the interior surface of latch bracket 36 are latch pin brackets 52, designed to slidably receive and hold latch pin 46. Extended latch handle 44 is formed integral with latch pin 46 and configured such that when latch pin 46 is withdrawn in an upward direction from engagement with the hole in latch hole bracket 48, pin 46 and handle 44 can be rotated outward so that latch pin handle 44 rests atop the top surface of pickup truck sidewall 42 to hold latch pin 46 out of engagement with latch hole bracket 48, thus eliminating the need for simultaneous operation of both the left and right latch assemblies and facilitating the sequential operation of the left and right latch assemblies by a single person. Spring 54 which is biased against the upper latch pin bracket 52 and spring retainer 56 is provided to bias latch pin 46 to the closed position when latch handle 44 is not resting against top surface 42 of the pickup truck bed.

Figure 2:
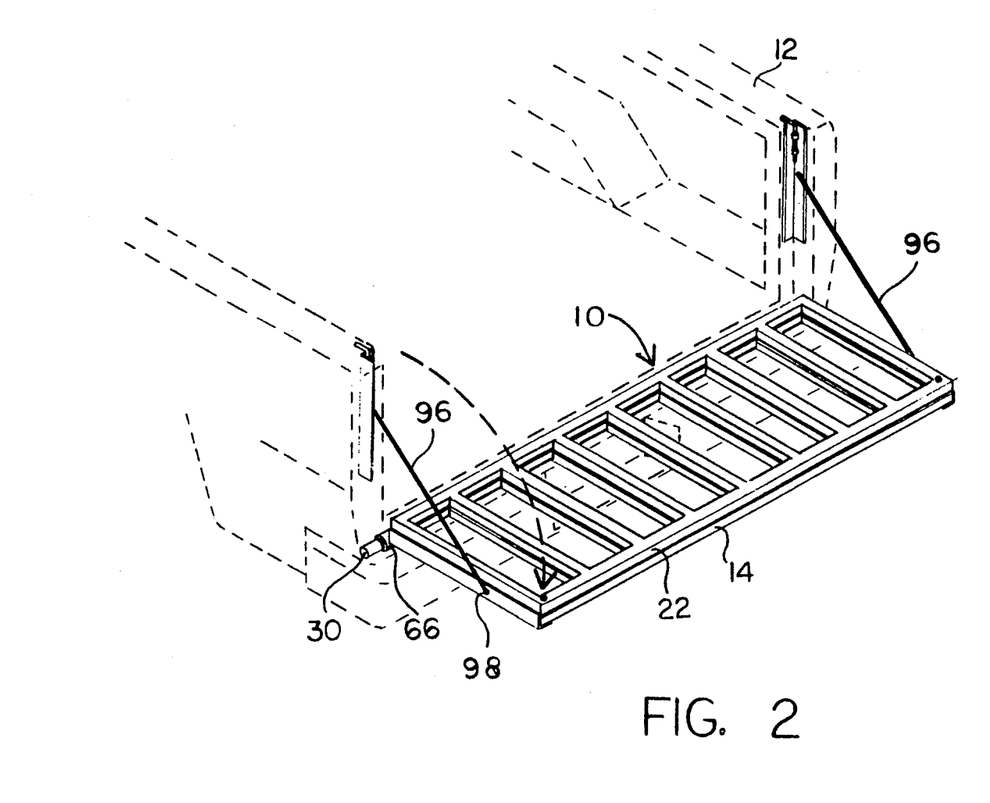
FIG. 2 is a perspective representational view of the combination tailgate and ramp assembly configured as a tailgate and held in the open position.

As shown in FIG. 2, tailgate straps 96 are provided to hold assembly 10, when in tailgate configuration, in horizontal position. Each strap 96 is provided with conventional cam locks 98, which facilitate easy and quick removal of straps 96 when reconfiguring assembly 10 to a ramp configuration. Thus, when used as a conventional pickup truck tailgate, the combination tailgate ramp assembly 10 functions as would any other tailgate having two independent side latches.

Figure 3:
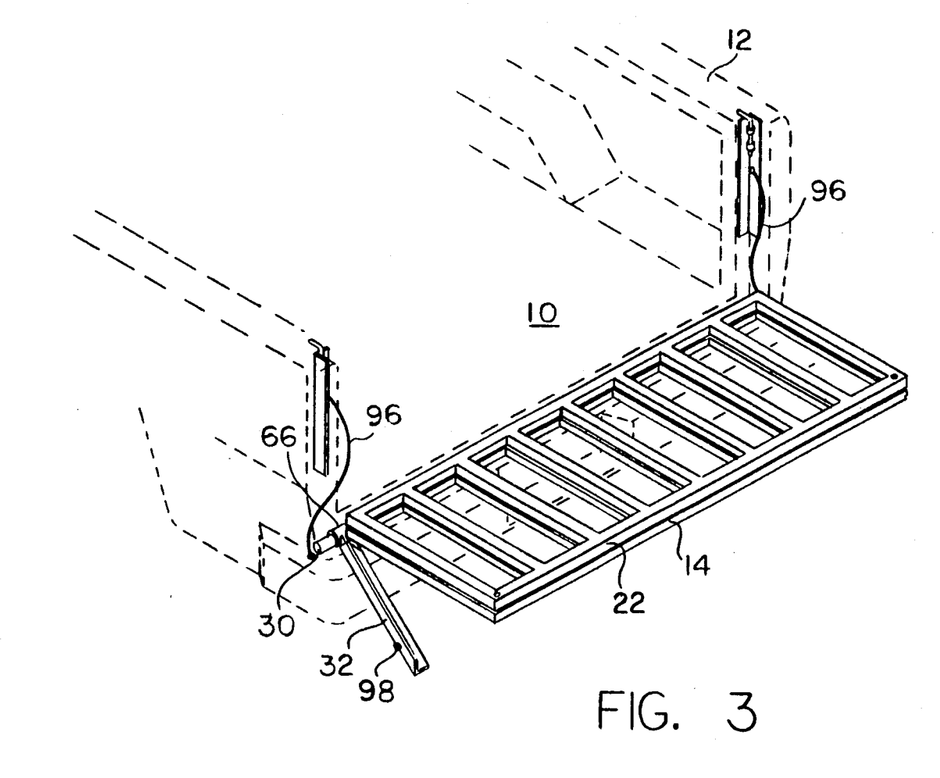
FIG. 3 is a perspective representational view of the combination tailgate and ramp assembly configured as a tailgate and held in the open position, with the ramps and fastening brackets detached.

To convert the combination tailgate assembly ramp assembly 10 to a ramp configuration, the assembly is first lowered to the lowered tailgate position as shown in FIG. 2, and bolts 58 removed to disconnect right ramp 22, left ramp 14 and fastener brackets 32 and 72 as shown in FIG. 3. Straps 96 are then disconnected from fastener brackets 32 and 72. Fastener brackets 32 and 72 are then lowered down out of the way, and play no further part in the changeover to a ramp configuration.

Figure 5:
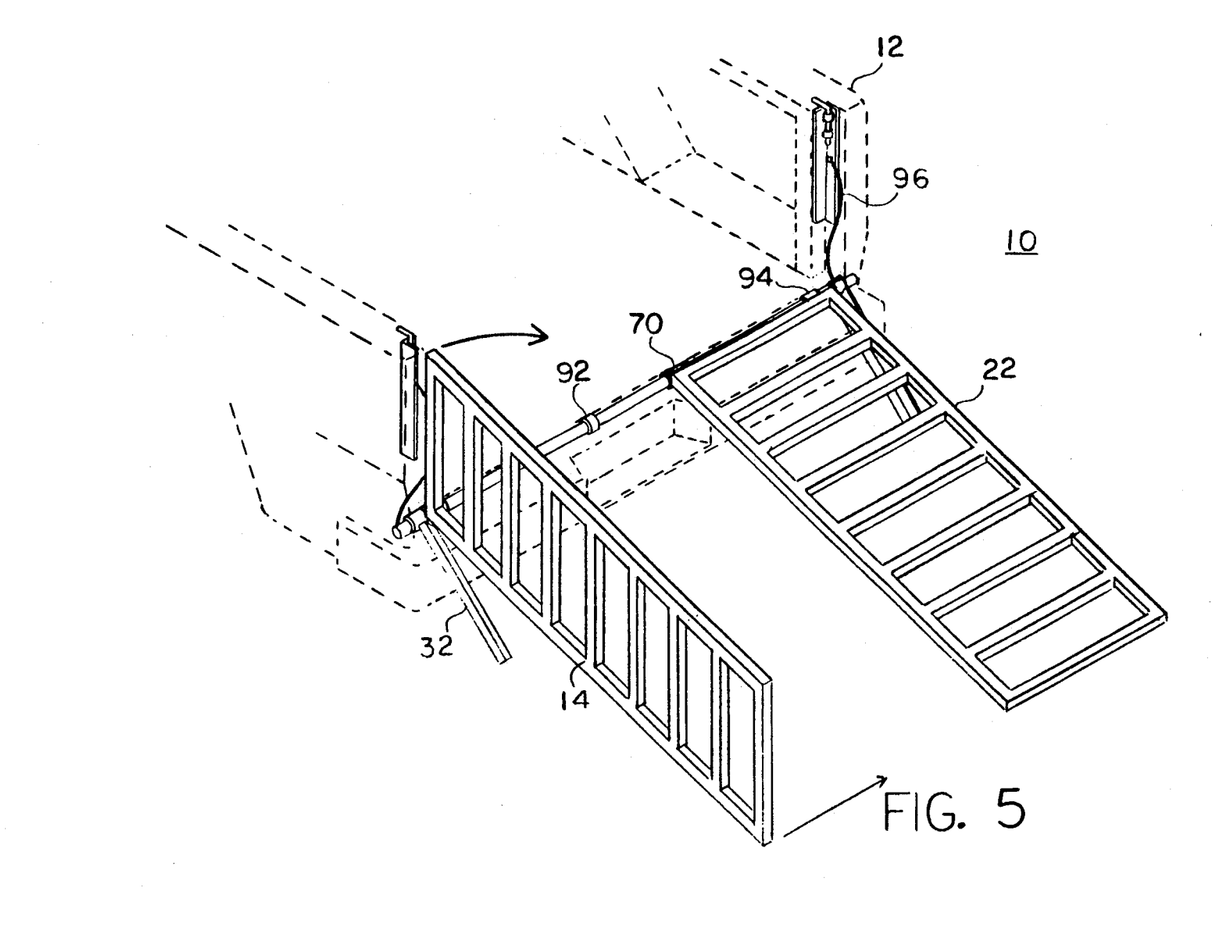
FIG. 5 is a perspective representational view of the combination tailgate and ramp assembly with the right ramp in the ramp configuration and the left ramp being positioned into the ramp configuration.
Figure 6:
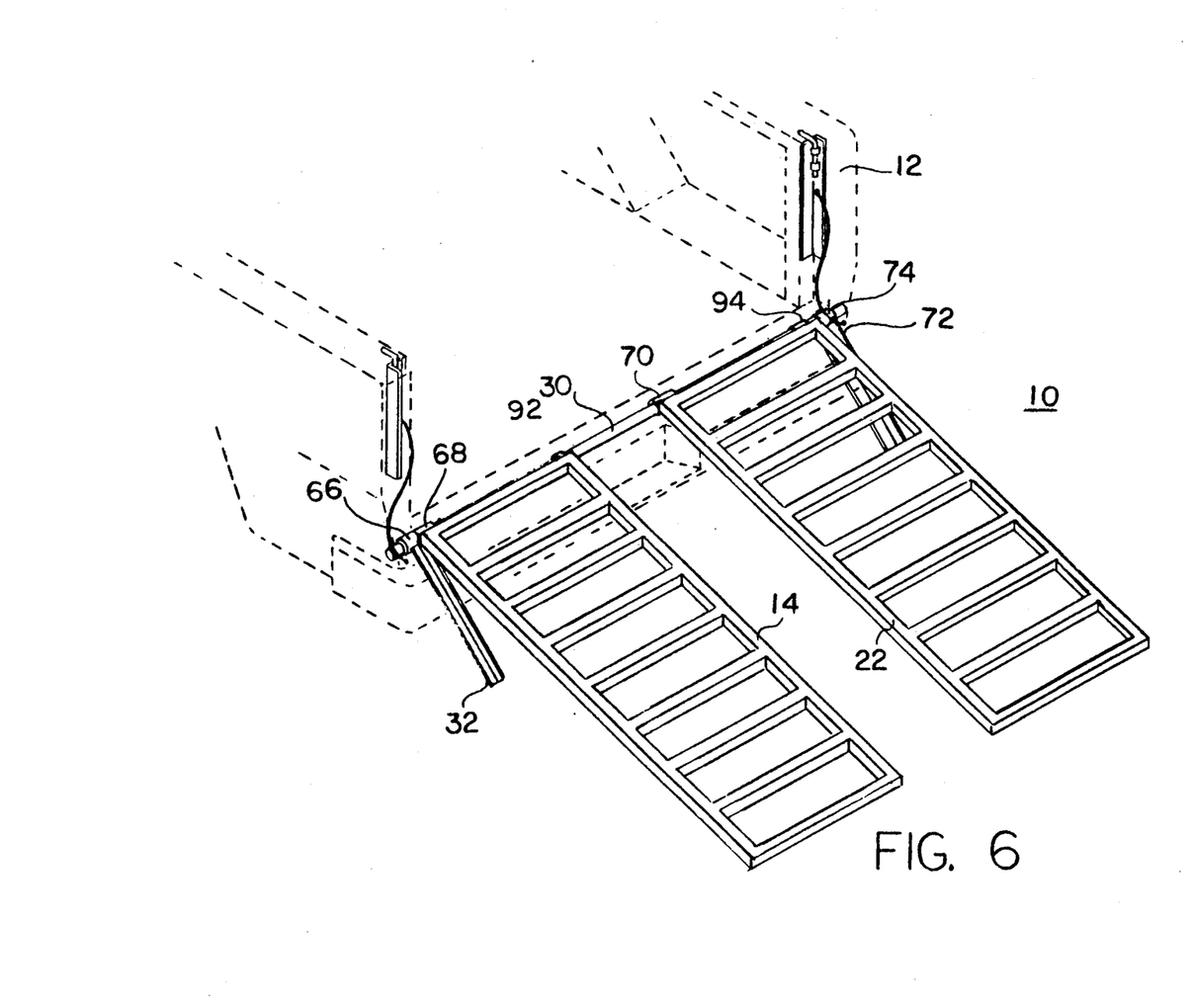
FIG. 6 is a perspective representational view of the combination tailgate and ramp assembly in the ramp configuration.

Once the ramps have been disconnected, as shown in FIG. 4, right ramp 22, which is now residing atop left ramp 14, can be picked up and rotated about right spring pin hinge 70 as right swing pin hinge 70 is slid along sliderail 30 toward the centerline of the pickup truck. Once this is accomplished, right ramp 22 can be slid into position as is shown in FIG. 5. With right ramp 22 in position, it can be lifted slightly to slide left ramp 14 out from underneath it to a position generally parallel to right ramp 22, but outside of the area of the pickup truck bed. From this position it can then be flipped over as shown in FIG. 5 to bring it into alignment with right ramp 22 to form the completed ramp assembly as shown in FIG. 6.

Figure 7:
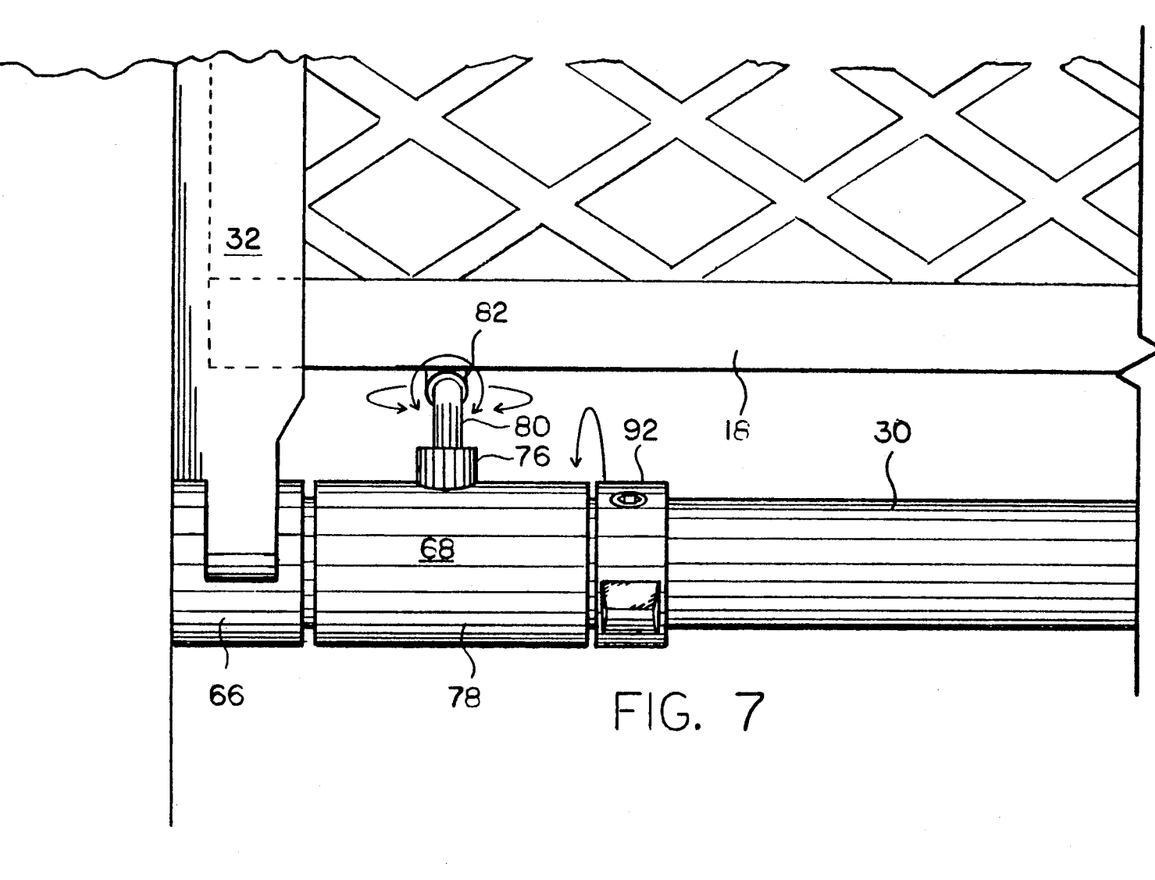
FIG. 7 is a side view of the left swing pin hinge.
Figure 8:
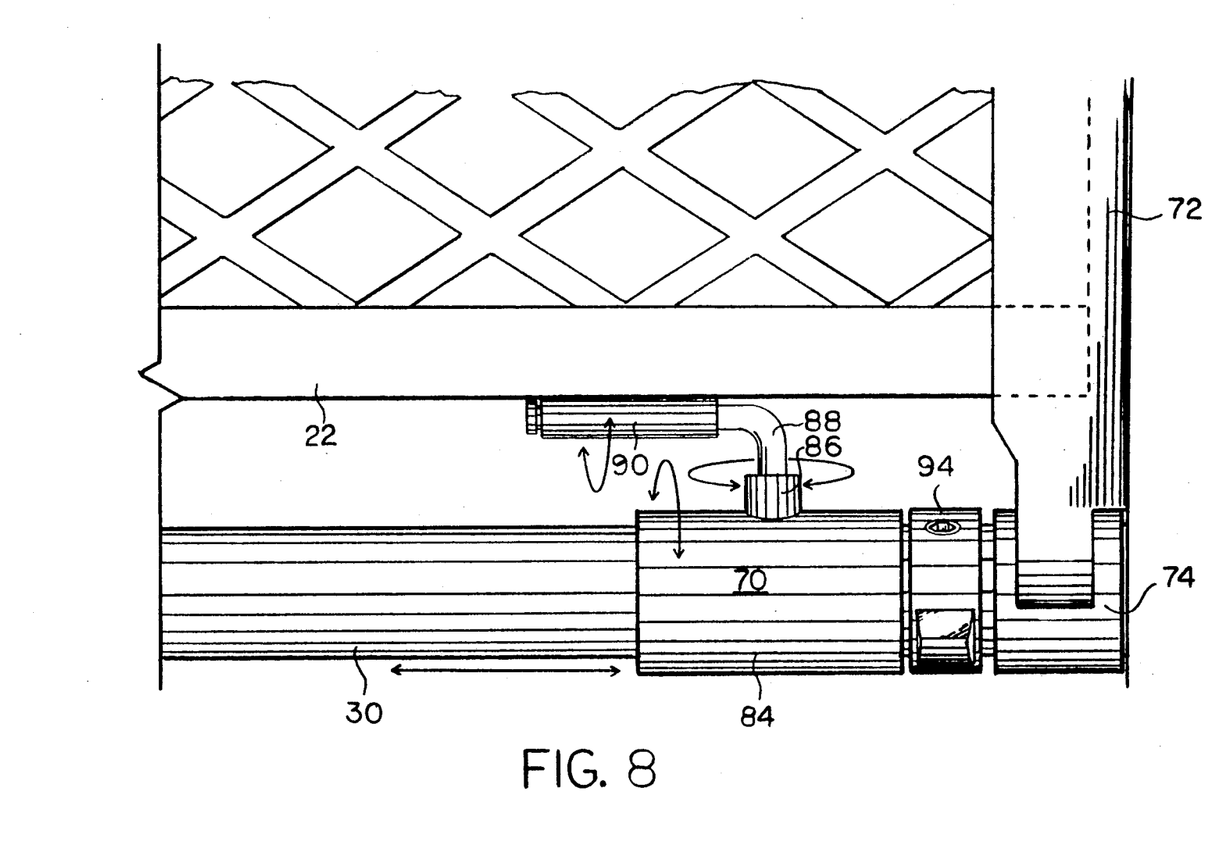
FIG. 8 is a side view of the right swing pin hinge.

This sort of operation is made possible by the combination of left swing pin hinge 68 and right swing pin hinge 70, as shown in FIGS. 7 and 8. While there are similarities in the construction and operation of both, only one, and in this case right swing pin hinge 70, as shown in FIG. 8, need be capable of sliding laterally along sliderail 30.

Left swing pin hinge 68, as shown in FIG. 7, is formed of left hinge collar 78, which is capable of rotational movement around and about the axis of sliderail 30. Extending normally out from the elemental surface of left hinge collar 78 is left pin collar 76, which rotatably holds left hinge pin 80. Left hinge pin 80 is elbow shaped so that when it is rotatably held within left ramp collar 82, the ramp is capable of being rotated in three separate axis, the first for raising and lowering the ramp when configured for use as a tailgate by rotation of left hinge collar 78 about sliderail 30, then for swinging left ramp 14 swinging from the tailgate configuration out to the ramp position by rotation of left hinge pin 80 within left pin collar 76, and finally for flipping left ramp 14 over into its usable ramp position by rotation of left ramp collar 82 about left hinge pin 80.

It is not necessary that left hinge collar 78 be longitudinally slidable along sliderail 30, however, there is no reason why it cannot be so, and in fact, if it does slide longitudinally along sliderail 30, then the position of left ramp 14 relative to the truck bed and right ramp 22 becomes adjustable. For example, if left hinge collar 78 is slidable along sliderail 30, then it is possible to push both left ramp 14 and right ramp 22 together at the center of the pickup truck bed for loading smaller wheel base items such as power lawn mowers and garden equipment into the pickup truck.

In a like manner, right swing pin hinge assembly 70, as shown in FIG. 8, provides for pivotal motion along three separate axis for the conversion of combination tailgate and ramp assembly 10 from the tailgate configuration to the ramp configuration. Referring to FIGS. 4 and 8, it can be seen the first movement required for the conversion is the rotation of the tailgate from an upright latched position to the tailgate down position by rotation of right hinge collar 84 about sliderail 30. This is followed by the lateral displacement of right hinge collar 84 along sliderail 30 as shown in FIG. 4. Once this has been accomplished, right ramp 22 is rotated out by means of rotation of right hinge pin 88 within right pin collar 86 to position right ramp 22 in the ramp position, as shown in FIG. 6. This is followed by a final operation of setting right ramp 22 by rotation of right ramp collar 90 about hinge pin 88. It should be apparent that by reason of the ability to slide right swing pin hinge 70 along sliderail 30, the position of right ramp 20 is inherently adjustable along the length of slide rail 30.

Inherent to the design of both left and right swing hinge pin assemblies 68 and 70, is the fact that the left and right ramps 14 and 22 are held at an elevated position in relation to slide rail 30. As a result, both left and right ramps 14 and 22 will have an unsupported corner held in spaced relationship to slide rail 30 when in the ramp configuration of FIG. 6. The inherent rigidity of structure materials used in the fabrication of the combination tail gate and ramp assembly will hold the ramps in this position, means that it will not be much of a problem when moving relatively light loads up and down the ramp. However, with any sizable load, the inside corners of the ramp will collapse down on to slide rail 30. To prevent this, slidable cam spacers 92 and 94 are provided. Both are sleeved on to slide rail 30 as shown in FIGS. 7 and 8, with the spacer cams rotated down. When each of the ramps are positioned into the ramp configuration as shown in FIG. 6, the cam spacers can be slid into the appropriate position and rotated to position the spacers so that they support the free end of the ramp against slide rail 30.

Reconversion from the ramp configuration to tailgate configuration is accomplished in a similar manner simply by reversing the steps set forth above.

Figure 11:
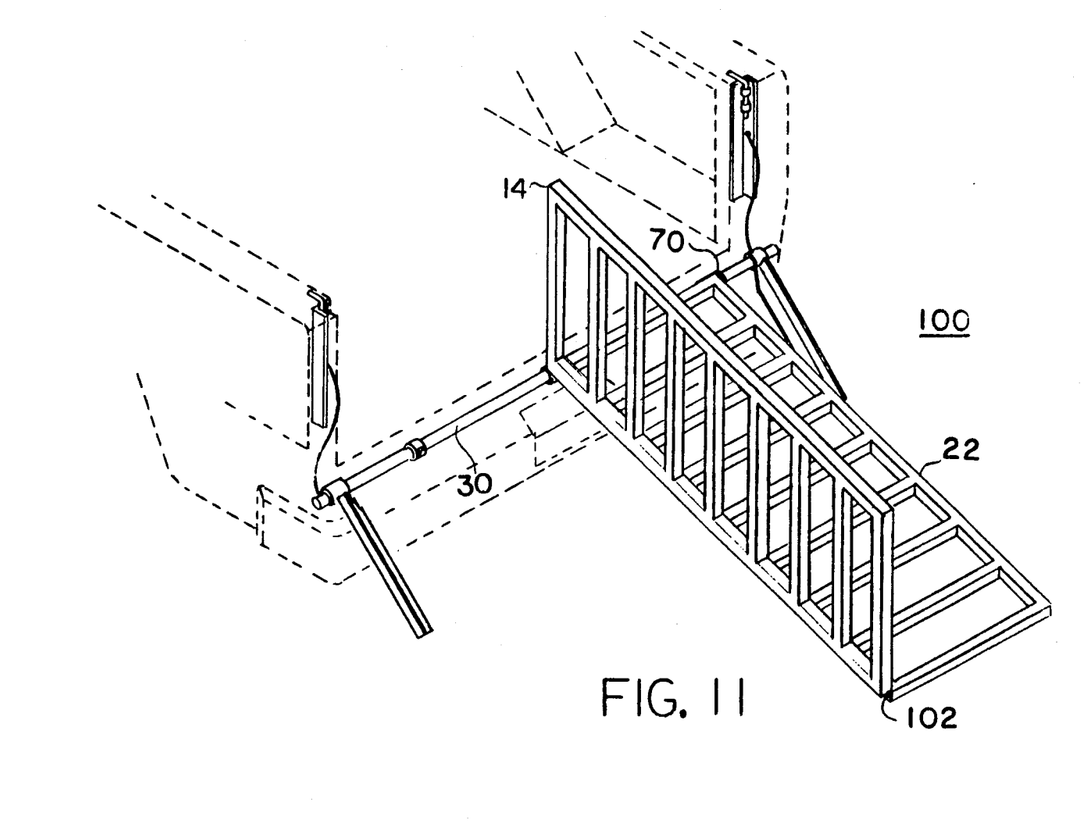
FIG. 11 is a perspective representational view of a second embodiment being unfolded into the ramp configuration.

A second embodiment of the combination tailgate and ramp assembly 100 is shown in FIG. 11. In this embodiment, right ramp 22 is still connected to sliderail 30 by means of right swing pin hinge 70. However, instead of having left ramp 14 attached to sliderail 30 by means of left swing pin hinge 68, it is instead attached by piano hinge 102 to right ramp 22. The advantage of this embodiment is simplicity of construction; the disadvantage is the increased unit weight that the person manipulating the combined ramp must move about at one time and the fact that the ramps are no longer adjustable with regard to spacing in the ramp configuration.

In a third embodiment, left ram 14 is eliminated entirely. This is the lightest and simplest embodiment and will be suitable for use with motorcycles or the like.

While there is shown and described the present preferred embodiment of the invention, it is to be distinctly understood that this invention is not limited thereto but may be variously embodied to practice within the scope of the following claims.

I claim:

1. A combination tailgate and ramp assembly for use with a vehicle having a truck bed, side walls, a longitudinal axis and a transverse axis, which comprises:

a slide rail for serving as a pivot axis for movement of the tailgate assembly from a substantially vertical position to a substantially horizontal position attached to the end of the truck bed parallel to the transverse axis;

a first ramp and a second ramp, each having a longitudinal axis, and each adapted for attachment, at one corner to a first and second swing pin hinge, respectively, and each further configured in size and shape to serve, in a orientation with its longitudinal axis parallel to the transverse axis of the truck bed, as a tailgate closure panel;

said first swing pin hinge for rotatable attachment to said first ramp at a corner of said ramp, said first swing pin hinge configured for rotation about the axis of the slide rail, for transverse displacement along the slide rail, for angular rotation of the first ramp from a transverse orientation of its longitudinal axis to an orientation parallel to the longitudinal axis of the truck bed, and for axial rotation of the first ramp panel normal to the axis of the slide rail;

said second swing pin hinge for rotatable attachment to said second ramp at a corner of said ramp, said second swing pin hinge configured for rotation about the axis of the slide rail, for angular rotation of the second ramp from a transverse orientation of its longitudinal axis to an orientation parallel to the longitudinal axis of the truck bed, and for axial rotation of the second ramp panel normal to the axis of the slide rail;

means for rotatably and slidably attaching the first swing pin hinge to the slide rail;

means for rotatably attaching the second swing pin hinge to the slide rail;

means for rotatably attaching the first swing pin hinge to the first ramp; and means for rotatably attaching the second swing pin hinge to the second ramp.

2. The combination tailgate and ramp assembly of claim 1 which further comprises:

means for fastening the pair of ramps together in transverse orientation; and means for latching the fastened pair of ramps to the side walls of the truck bed in a vertical, and transverse orientation.

3. The combination tailgate and ramp assembly of claim 2 wherein the means for fastening the pair of ramps together further comprises a pair of fastening brackets each rotatably attached to the slide rail transversely outward of swing pin hinge.

4. The combination tailgate and ramp assembly of claim 2 wherein the means for latching the pair of ramps to the side walls of the truck bed further comprises a pair of latches, each having a downwardly extendable latch pin slidably attached to a truck bed side wall and a latch pin receiving bracket attached to a ramp for removably holding a downwardly extended latch pin.

5. A combination tailgate and ramp assembly for use with a vehicle having a truck bed, side walls, a longitudinal axis and a transverse axis, which comprises:
  a slide rail for serving as a pivot axis for movement of the tailgate assembly from a substantially vertical position to a substantially horizontal position attached to the end of the truck bed parallel to the transverse axis;
  a ramp having a longitudinal axis, adapted for attachment, at one corner to a swing pin hinge, and further configured in size and shape to serve, in a transverse orientation of its longitudinal axis, as a tailgate closure panel;
  said swing pin hinge for rotatable attachment to the ramp at said corner of said ramp, said swing pin hinge configured for rotation about the axis of the slide rail, for transverse displacement along the slide rail, for angular rotation of t he ramp from a transverse orientation of its longitudinal axis to an orientation parallel to the longitudinal axis of the truck bed, and for axial rotation of the ramp panel normal to the axis of the slide rail;
  means for rotatably and slidably attaching the swing pin hinge to the slide rail; and
  means for rotatably attaching the swing pin hinge to the ramp.

6. The combination tailgate and ramp assembly of claim 5 which further comprises means for latching the ramp to the side walls of the truck bed in a vertical, and transverse orientation.

7. The combination tailgate and ramp assembly of claim 6 wherein the means for latching the pair of ramps to the side walls of the truck bed further comprises a pair of latches, each having a downwardly extendable latch pin slidably attached to a truck bed side wall and a latch pin receiving bracket attached to a ramp for removably holding a downwardly extended latch pin.

8. The combination tailgate and ramp assembly of claim 5 which further comprises:
  a pair of fastening brackets each rotatably attached to the slide rail transversely outward of the swing pin hinge; and
  means for removably attaching the fastening brackets to the ends of the ramp.

9. The combination tailgate and ramp assembly of claim 5 which further comprises:
  a supplemental ramp configured in size and shape to fold over unto the ramp hingedly attached to said ramp parallel to its transverse axis.

* * * * *